Oct. 6, 1964

C. D. LAIDLEY 3,151,629

LIQUID LEVEL REGULATOR

Filed Aug. 31, 1960

INVENTOR.
Clarence D. Laidley
BY
Robert J. Patch
ATTY.

United States Patent Office 3,151,629
Patented Oct. 6, 1964

3,151,629
LIQUID LEVEL REGULATOR
Clarence D. Laidley, 5313 Byron St.,
Oklahoma City, Okla.
Filed Aug. 31, 1960, Ser. No. 53,300
4 Claims. (Cl. 137—579)

The present invention relates to liquid level regulators.

It is an object of the present invention to provide a liquid level regulator that can be quickly and easily set to any one of a number of operative positions.

Another object of the present invention is the provision of a liquid level regulator so constructed as to give a visual indication of its setting.

Finally, it is an object of the present invention to provide a liquid level regulator which will be relatively easy and inexpensive to manufacture, simple and fast in operation, and rugged and durable in use.

Other objects and advantages of the present invention will become apparent from a consideration of the following description, taken in connection with the accompanying drawing, in which.

Figure 2:
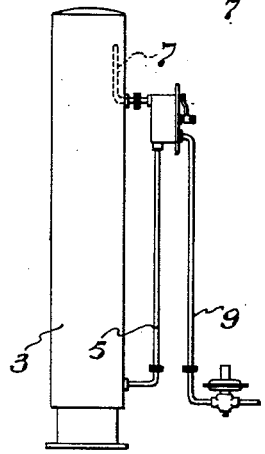
FIGURE 2 is a side elevational view of an installed regulator according to the present invention.

Referring now to the drawing in greater detail, there is shown a liquid level regulator indicated generally at 1 and adapted to be installed in connection with a container for a body of liquid, such as an oil container 3 having liquid entry and exit lines (not shown). Regulator 1 is itself attached to a liquid entry line 5 by which liquid from container 3 is supplied to the regulator, and an equalizer line 7 open at its upper end of the atmosphere for the purpose of equalizing the pressure within regulator 1. A liquid overflow line 9 removes the overflow from regulator 1 so as to keep the level of the liquid in the regulator and hence the level of the liquid in container 3 at the desired height.

Regulator 1 comprises a generally hollow body 11 made up of a cup-shaped member 13 which is closed by a cover 15 held in place by nut and bolt assemblies 17. Cup-shaped member 13 is provided with a liquid inlet port 19 at its bottom, in which liquid entry line 5 is screw-threadedly held, and a gas port 21 adjacent its top, in which equalizer line 7 is screw-threadedly held. Cover 15 is provided with a liquid outlet port 23 in which an end of overflow line 9 is screw-threadedly held. A major portion of the interior of the regulator, however, is given over to a regulator chamber 25; and it is to be noted that ports 19, 21 and 23 all communicate with chamber 25. Chamber 25, however, is divided into two portions 27 and 29. Ports 19 and 21 communicate directly with portion 27, while port 23 communicates directly with portion 29.

Disposed in chamber 25 is a flat circular plate 31 which is displaced from the horizontal and in the illustrated embodiment is shown as vertical. Plate 31 is mounted fixedly on the inner end of a shaft 33 which is shown supported for turning movement and axial sliding movement in and extending through cover 15. Conventional O-ring seals make shaft 33 watertight in cover 15. The axis of shaft 33 is displaced from the vertical and in the preferred embodiment is horizontal.

Within chamber 25 and integral with the inner side of cover 15 is an annular shoulder 35 which terminates in a relatively narrow sealing edge. Plate 31 is provided with an annular elastic deformable gasket 37 of rubber or the like of an outer diameter greater than the diameter of the adjacent edge of shoulder 35 and an inner diameter less than the diameter of that edge of shoulder 35. Thus, when plate 31 bears against shoulder 35, the shoulder digs into and deforms gasket 37 thereby completing the seal between plate 31 and shoulder 35. It should also be noted that gasket 37 is of high frictional properties, thereby to prevent slipping between shoulder 35 and gasket 37.

Plate 31 is provided with an opening 39 therethrough displaced from the axis of shaft 33. Opening 39 is the only passageway for liquid between chamber portions 27 and 29; and hence, it is obvious that the elevation at which liquid passes between chamber portions 27 and 29 is determined by the elevation of opening 39, and that the elevation of opening 39 may be adjusted by rotating shaft 33 and with it plate 31. Otherwise, chamber portions 27 and 29 are completely sealed from each other and outlet port 23 is completely sealed from ports 19 and 21.

Shaft 33 extends through and beyond cover 15 and carries adjacent its outer end a handle 41 which is an actuator by which the shaft, and with it plate 31, may be rotated. In order to maintain shoulder 35 pressed firmly into deformable gasket 37 to deform the gasket into liquid sealing relationship, a coil compression spring 43 is disposed between handle 41 and cover 15 and acts continuously yieldably to urge plate 31 toward and into liquid sealing relationship against shoulder 35. A pointer 45 is also secured to handle 41 and points selectively to various indicia on cover 15 to give a visual indication of the height of opening 39 and hence of the regulated liquid level in chamber 25.

Figure 3:
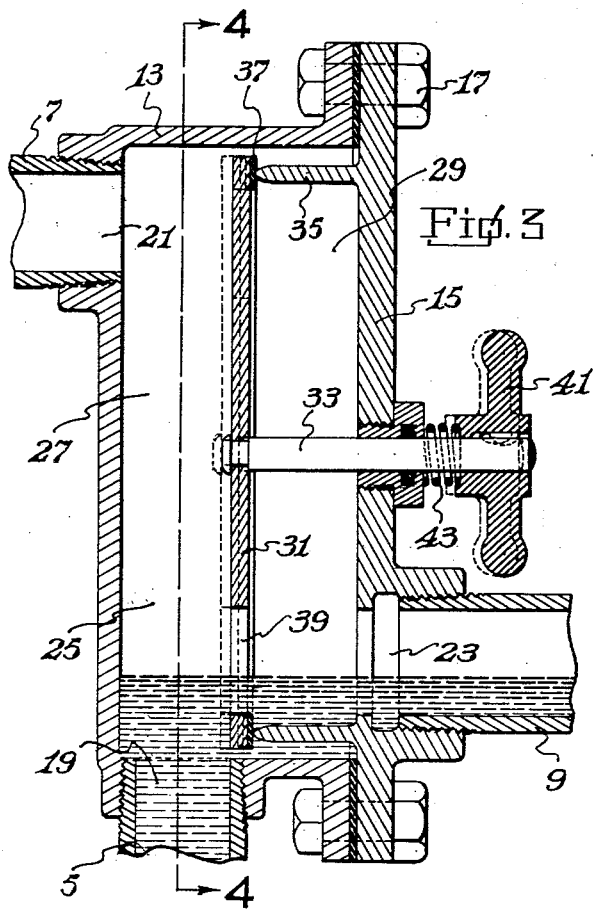
FIGURE 3 is an enlarged cross-sectional view of a regulator according to the present invention and showing the operative position in full line and the position during adjustment in phantom line.

The operation of the device will now be apparent. When it is desired to assure a relatively low liquid level in the container in connection with which the regulator of the present invention operates, handle 41 is pushed inward toward cover 15, thus sliding shaft 33 axially farther into chamber 25 against the action of spring 43 and at the same time moving plate 31 away from its gasketed seat on shoulder 35 to the phantom line position shown in FIGURE 3. In this position, gasket 37 is spaced from shoulder 35 and does not offer frictional resistance to the rotation of plate 31. Hence, handle 41 may be turned until pointer 45 indicates the desired liquid level. At that point, the handle is released and spring 43 returns the assembly to the seated and sealed relationship shown in FIGURE 3 in full line.

Figure 1:
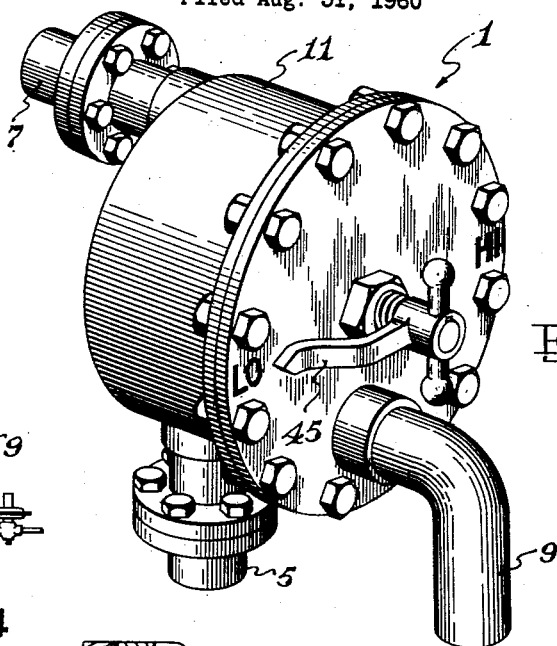
FIGURE 1 is a perspective view of a liquid level regulator according to the present invention.
Figure 4:
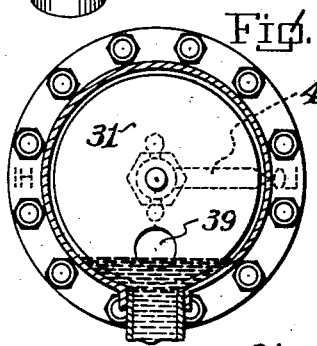
FIGURE 4 is a section along the line 4—4 of FIGURE 3.
Figure 5:
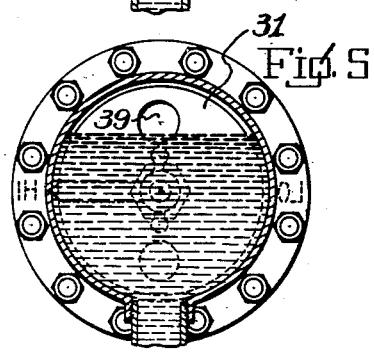
FIGURE 5 is a view similar to FIGURE 4 but showing the regulator in another operative position.

If pointer 45 were placed at the "lo" reading corresponding to the relatively low liquid level, the parts would be disposed as seen in FIGURE 4, with opening 39 in its lowermost position. In this position, liquid from line 5 may flow through opening 39 and out overflow line 9 while rising to a minimum level. In view of the free communication above and below the liquid level in container 3 as provided by lines 5 and 7, the liquid level in container 3 rapidly duplicates that in regulator chamber 25. But if it is desired to maintain a higher liquid level in container 3, then handle 41 is pushed in and pointer 45 rotated clockwise as seen in FIGURE 1 to a higher reading. During this movement, in which pointer 45 moves clockwise as seen in FIGURE 1 and counterclockwise as seen in FIGURES 4 and 5, opening 39 is also moving counterclockwise to higher positions or to the highest position shown in FIGURE 5. In this connection, it should be noted that shoulder 35 entirely encompasses port 23 and opening 39 in all positions of the present invention.

Although it is easy to rotate handle 41 and shaft 3 and plate 31 as a unit when the handle is pushed in, when the handle is released spring 43 brings gasket 37 and shoulder 35 into liquid sealing relationship with each other and also into a close frictional contact so that the setting of the regulator cannot be accidentally or inadvertently changed.

From a consideration of the foregoing, it will be obvious that all of the initially recited objects of the invention have been achieved.

It is to be understood that the appended claims are to be accorded a range of equivalents commensurate in scope with the advance made over the prior art.

What is claimed is:

1. A liquid level regulator comprising a body having an inlet and an outlet communicating with a regulator chamber within the body, a shaft extending through a sidewall of the body and displaced from the vertical and rotatable about its axis, said axis being disposed a substantial distance above both the inlet and the outlet, an actuator secured to the shaft outside the body for rotating the shaft, a flat plate perpendicular to the axis of the shaft and secured to the shaft within the chamber and having a diameter several times the diameter of either the inlet or the outlet and having an opening therethrough displaced a substantial distance from said axis, the plate and the body having sealing engagement with each other entirely about said opening thereby to seal the inlet and outlet from each other along any path other than through said opening, and means defining a vent for the regulator chamber in an upper portion of the regulator chamber a substantial distance above said axis for equalizing the pressure above the liquid in the regulator and the pressure above the liquid whose level is to be regulated.

2. A liquid level regulator comprising a body having an inlet and an outlet communicating with a regulator chamber within the body, a flat circular plate, means mounting the plate within the body in the regulator chamber for rotation in its plane about an axis displaced from the vertical, the plate having a diameter several times the diameter of either the inlet or the outlet and having an opening therethrough displaced a substantial distance from said axis, the plate and the body having sealing engagement with each other entirely about said opening thereby to seal the inlet and the outlet from each other along any path other than through said opening, and means defining a vent for the regulator chamber in an upper portion of the regulator chamber a substantial distance above said axis for equalizing the pressure above the liquid in the regulator and the pressure above the liquid whose level is to be regulated.

3. A liquid storage system comprising means defining a liquid storage chamber and means defining a regulator chamber having an inlet communicating with a lower portion of the storage chamber and an outlet, a shaft extending from outside the regulator chamber to within the regulator chamber and displaced from the vertical and rotatable about its axis, said axis being disposed a substantial distance above both the inlet and the outlet, an actuator secured to the shaft outside the regulator chamber for rotating the shaft, a flat plate perpendicular to the axis of the shaft and secured to the shaft within the regulator chamber and having a diameter several times the diameter of either the inlet or the outlet and having an opening therethrough displaced a substantial distance from said axis, the plate and the side walls of the regulator chamber having sealing engagement with each other entirely about said opening thereby to seal the inlet and the outlet from each other along any path other than through said opening, and means defining a pressure-equalizing passageway between an upper portion of the storage chamber and an upper portion of the regulator chamber.

4. A liquid storage system comprising means defining a liquid storage chamber and means defining a regulator chamber having an inlet communicating with a lower portion of the storage chamber and an outlet, a flat circular plate, means mounting the plate within the regulator chamber for rotation in its plane about an axis displaced from the vertical, the plate having a diameter several times the diameter of either the inlet or the outlet and having an opening therethrough displaced a substantial distance from said axis, the plate and the side walls of the regulator chamber having sealing engagement with each other entirely about said opening thereby to seal the inlet and the outlet from each other along any path other than through said opening, and means defining a pressure-equalizing passageway between an upper portion of the storage chamber and an upper portion of the regulator chamber.

References Cited in the file of this patent

UNITED STATES PATENTS

| | | |
|---|---|---|
| 1,323,234 | Faber | Nov. 25, 1919 |
| 1,620,164 | Milliff | Mar. 8, 1927 |
| 1,933,918 | McIntosh | Nov. 7, 1933 |
| 2,111,169 | Clark | Mar. 15, 1938 |
| 2,536,946 | Larson | Jan. 2, 1951 |
| 2,619,984 | Ashton | Dec. 2, 1952 |